United States Patent
Han et al.

(10) Patent No.: US 10,324,320 B2
(45) Date of Patent: Jun. 18, 2019

(54) DISPLAY APPARATUS AND TILED DISPLAY DEVICE INCLUDING THE SAME

(71) Applicant: Samsung Display Co., Ltd., Yongin-Si, Gyeonggi-Do (KR)

(72) Inventors: Sangsun Han, Suwon-si (KR); Kyu-tae Park, Ulsan (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 43 days.

(21) Appl. No.: 15/341,093

(22) Filed: Nov. 2, 2016

(65) Prior Publication Data

US 2017/0322443 A1    Nov. 9, 2017

(30) Foreign Application Priority Data

May 9, 2016  (KR) .................. 10-2016-0056634

(51) Int. Cl.
*G02F 1/1333*   (2006.01)
*G02F 1/1335*   (2006.01)

(52) U.S. Cl.
CPC .... *G02F 1/133308* (2013.01); *G02F 1/13336* (2013.01); *G02F 1/133504* (2013.01); *G02F 1/133602* (2013.01); *G02F 2001/133317* (2013.01); *G02F 2203/01* (2013.01)

(58) Field of Classification Search
CPC .................... G02F 1/133308; G02F 2001/133311–2001/13334
See application file for complete search history.

(56) References Cited

U.S. PATENT DOCUMENTS

2014/0204281 A1*   7/2014   Maeda .............. G02F 1/133611
                                                    348/794
2014/0327855 A1    11/2014   Tang

FOREIGN PATENT DOCUMENTS

KR   1020140066842 A   6/2014
KR   1020150009058 A   1/2015
KR   1020150051470 A   5/2015

* cited by examiner

*Primary Examiner* — Sean P Gramling
(74) *Attorney, Agent, or Firm* — Cantor Colburn LLP

(57) ABSTRACT

A display apparatus includes a display unit including a non-display region and a display region which extends from the non-display region in a direction defining an extension direction of the display region, and a supporting member on which the display unit is supported. The supporting member includes an intermediate mold including a first intermediate support disposed in the non-display region and an intermediate seat portion extending in the extension direction of the display region from the first intermediate support and disposed in the display region, and a transparent mold adjacent in the extension direction of the display region to the intermediate mold, between the intermediate seat portion and the display unit, and including a transparent support in an edge display region of the display region which is adjacent to the non-display region.

20 Claims, 7 Drawing Sheets

DISPLAY APPARATUS AND TILED DISPLAY DEVICE INCLUDING THE SAME

This application claims priority to Korean Patent Application No. 10-2016-0056634, filed on May 9, 2016, and all the benefits accruing therefrom under 35 U.S.C. § 119, the content of which in its entirety is herein incorporated by reference.

BACKGROUND (1) Field

The present disclosure herein relates to a display apparatus and a tiled display device including the same. More particularly, the present disclosure herein relates to a display apparatus, which has a narrow bezel and is capable of preventing an edge dark area from occurring, and a tiled display device including the same.

(2) Description of the Related Art

Display apparatuses may be classified into self-emissive type display apparatuses excluding a separate light source and non-emissive display apparatuses including a separate light source. Examples of the non-emissive display apparatuses may include electrophoretic display apparatuses, electrowetting display apparatuses, and so on.

SUMMARY

One or more exemplary embodiment of the present disclosure provides a display apparatus which has a relatively narrow bezel and is capable of reducing or effectively preventing an edge dark area from occurring, and a tiled display device including the same.

An embodiment of the invention provides a display apparatus including: a display unit including a non-display region at which an image is not displayed; and a display region at which the image is displayed with light and extending from the non-display region in a direction which defines an extension direction of the display region, the display region including an edge display region which is adjacent in the extension direction of the display region to the non-display region; and a supporting member on which the display unit is supported. The supporting member is disposed in the display region and the non-display region of the display unit and includes: an intermediate mold including a first intermediate support which is disposed in the non-display region of the display unit, and an intermediate seat portion which extends in the extension direction of the display region from the first intermediate support and is disposed in the display region of the display unit; and a transparent mold disposed adjacent in the extension direction of the display region to the intermediate mold, and between the intermediate seat portion of the intermediate mold and the display unit at the display region thereof. The transparent mold includes: a transparent support in the edge display region.

In an embodiment, the display apparatus may further include a diffusion plate. The transparent mold may include a transparent seat portion which extends in the extension direction of the display region from an end of the transparent support, and an end of the diffusion plate may be disposed overlapping the transparent seat portion of the transparent mold.

In an embodiment, the display region may further include a central display region adjacent in the extension direction of the display region to the edge display region, the transparent seat portion of the transparent mold may be in the central display region, and the end of the diffusion plate may be disposed between the transparent seat portion and the display unit at the central display region thereof.

In an embodiment, the transparent seat portion may support the diffusion plate.

In an embodiment, the transparent seat portion may be disposed between the intermediate seat portion of the intermediate mold and the display unit.

In an embodiment, the transparent support of the transparent mold may be disposed between the diffusion plate and the first intermediate support of the intermediate mold in the extension direction of the display region.

In an embodiment, the display unit may further include a display panel which generates and displays the image and an optical sheet which is disposed under the display panel. The first intermediate support of the intermediate mold and the transparent support of the transparent mold may each contact a bottom surface of the optical sheet to support the bottom surface of the optical sheet.

In an embodiment, a thickness of the transparent support may be greater than that of the diffusion plate, and a gap may be defined between the bottom surface of the optical sheet and a top surface of the diffusion plate.

In an embodiment, the display unit may further include a display panel which generates and displays the image. The first intermediate support of the intermediate mold and the transparent support of the transparent mold may each contact a bottom surface of the display panel to support the bottom surface of the display panel.

In an embodiment, the display apparatus may further include an optical sheet. The optical sheet may be disposed on the diffusion plate, and a gap may be defined between a top surface of the optical sheet and the bottom surface of the display panel.

In an embodiment, the first intermediate support and the transparent support may extend in a thickness direction of the display unit, and the intermediate seat portion of the intermediate mold may extend in the extension direction of the display region from a lower end of the first intermediate support and parallel to the display unit.

In an embodiment, the intermediate mold may further include an inclined portion extending in the extension direction of the display region and inclinedly downward from a distal end of the intermediate seat portion.

In an embodiment, the display apparatus may further include a diffusion plate. An end of the diffusion plate may be disposed between the intermediate seat portion of the intermediate mold and the display unit at the display region thereof, and the end of the diffusion plate may be spaced apart from the transparent support of the transparent mold in the extension direction of the display region.

In an embodiment, the transparent support may be attached to a side surface of the first intermediate support.

In an embodiment, the intermediate mold may further include a second intermediate support adjacent in the extension direction of the display region to the first intermediate mold support in the non-display region of the display unit, and the second intermediate support may be disposed in the edge display region to support the edge display region.

In an embodiment, a side surface of the second intermediate support may contact a side surface of the transparent support.

In an embodiment, the display apparatus may further include a light source which generates the light The light source may be disposed under the display region and spaced apart from the intermediate mold in the extension direction of the display region to emit the to a bottom surface of the display region.

In an embodiment, the display apparatus may further include a bottom cover in which the light source is received. The bottom cover may include a bottom portion on which the intermediate mold and the light source are disposed, and a sidewall which extends from the bottom portion. The sidewall of the bottom cover may be disposed between the first intermediate support of the intermediate mold and the bottom portion of the bottom cover to support the first intermediate support thereon.

In an embodiment, a side surface of the transparent mold may be coupled to a facing side surface of the intermediate mold at a double injection-molded interface therebetween, and an entirety of a bottom surface of the transparent mold may contact the intermediate mold.

In an embodiment of the invention, a tiled display device includes a display apparatus provided in plurality in a matrix form having M rows and N columns, where M and N are natural numbers. Each of the display apparatuses includes: a display unit including a non-display region at which an image is not displayed, and a display region at which the image is displayed with light and extending from the non-display region in a direction which defines an extension direction of the display region, the display region including an edge display region which is adjacent in the extension direction of the display region to the non-display region; and a supporting member on which the display unit is supported, the supporting member disposed in the display region and the non-display region of the display unit. The supporting member includes: an intermediate mold including: a first intermediate support which is disposed in the non-display region, and an intermediate seat portion which extends in the extension direction of the display region from the first intermediate support and is disposed in the display region of the display unit; and a transparent mold adjacent in the extension direction of the display region to the intermediate mold, and between the intermediate seat portion of the intermediate mood and the display unit at the display region thereof. The transparent mold including a transparent support in the edge display region.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
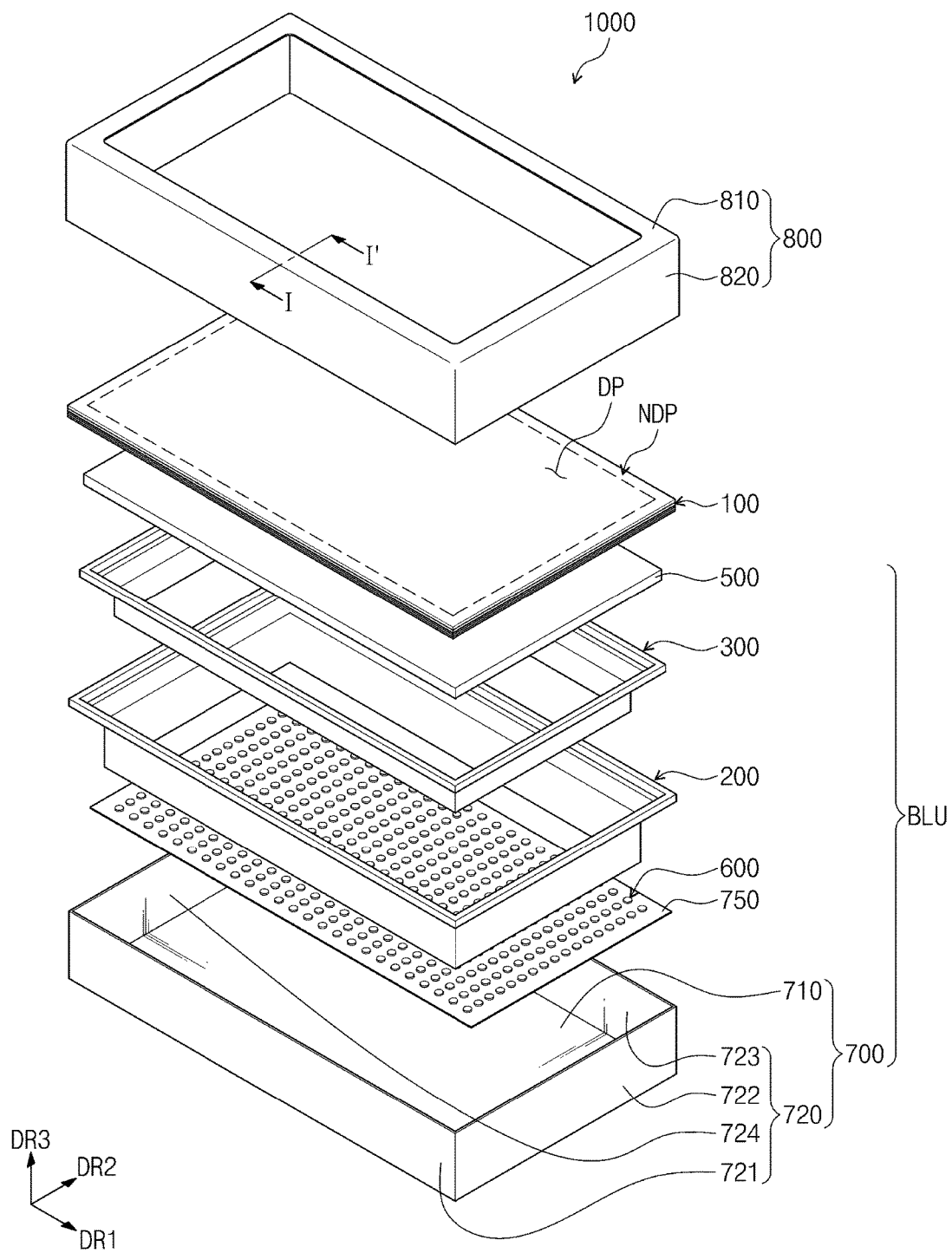
FIG. 1 is an exploded perspective view of an exemplary embodiment of a display apparatus according to the invention.

Since the present disclosure may make various modifications and have various shapes, particular embodiments are illustrated in the drawings and are described in the detailed description. However, this does not limited the present disclosure within particular embodiments and it should be understood that the present disclosure covers all the modification, equivalents, and replacements within the idea and technical scope of the invention. Also, anything unnecessary for describing the present disclosure will be omitted for clarity in the drawings, and like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A non-emissive display apparatus may include a display panel for adjusting transmittance of incident light to display an image with the light and a backlight unit for generating and providing the light to the display panel. For display apparatuses, a non-display area (or bezel) thereof is decreasing in width according to market needs. A display apparatus may have constituents coupled to each other at an area corresponding to the bezel. As the bezel decreases in width, the area at which the constituents of the display apparatuses are coupled to each other may decrease. Therefore, an improved display apparatus with a reduced bezel at which constituents of the display apparatus are firmly coupled to each other is desired.

Figure 2:
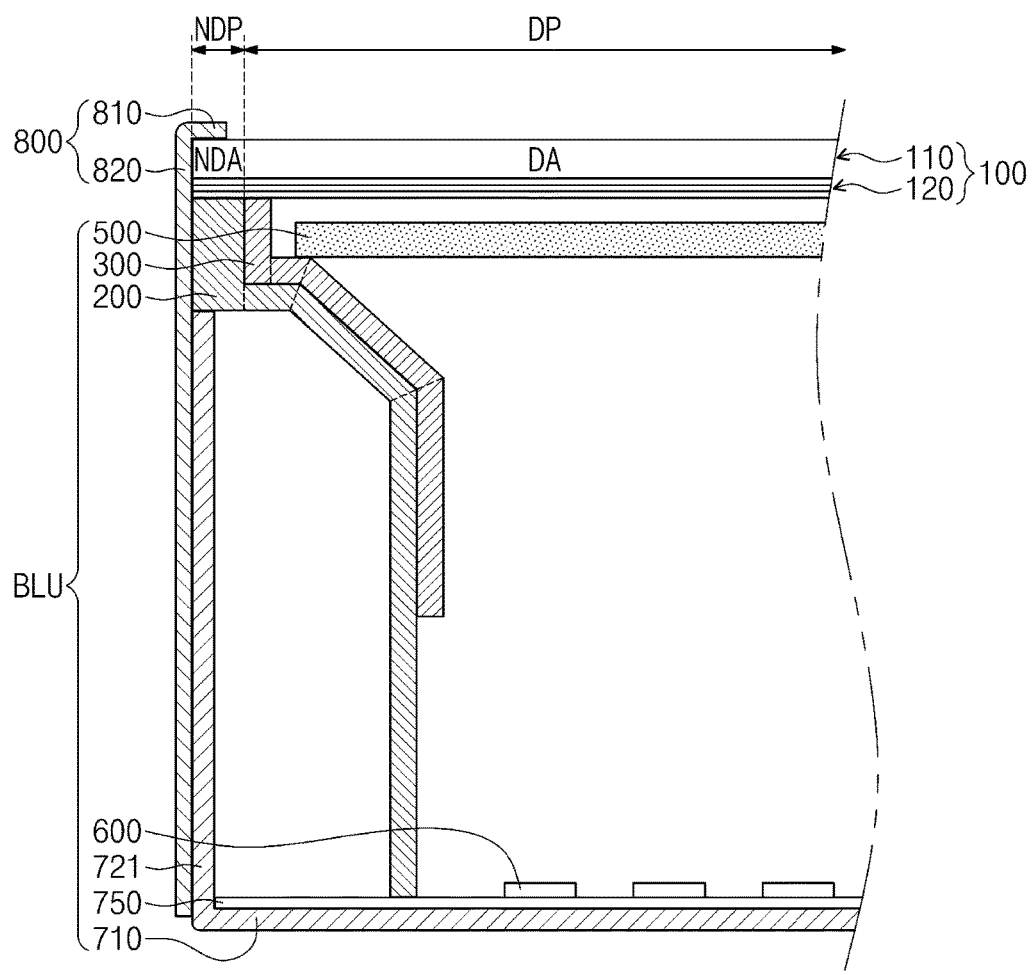
FIG. 2 is a cross-sectional view of an exemplary embodiment of an assembled state of the display apparatus taken along line I-I' of FIG. 1.

FIG. 1 is an exploded perspective view of an exemplary embodiment of a display apparatus according to the invention, and FIG. 2 is a cross-sectional view of an exemplary embodiment of an assembled state of the display apparatus taken along line I-I' of FIG. 1.

Referring to FIGS. 1 and 2, a display apparatus 1000 may include a display unit 100 and a backlight unit BLU.

The display unit 100 includes a non-display region NDP and a display region DP which extends from the non-display region NDP in at least one direction. The direction in which the display region DP extends from the non-display region NDP defines an extension direction of the display region DP. The non-display region NDP may, for example, extend from outer edges of the display region DP to surround the display region DP in a top plan view. The bezel of the display apparatus 1000 may correspond to the non-display region NDP of the display unit 100.

According to an embodiment of the invention, an image may be generated and displayed through the display region DP, but an image may not be generated and displayed through the non-display region NDP. In the top plan view, a bezel may be defined by the non-display region NDP. The display region DP and the non-display region NDP may define an entirety of the display unit 100.

As illustrated in FIG. 2, the display unit 100 may include, for example, a display panel 110 and an optical sheet (member) 120. The display unit 100 receives light from the backlight unit BLU to display an image with the light. The display panel 110 may be a non-emissive display panel such as a liquid crystal display panel, but the invention is not limited thereto. Hereinafter, the display panel 110 provided as the liquid crystal display panel will be described as an example.

The display panel 110 may include a display area DA and a non-display area NDA which extends from the display area DA in at least one direction. In an embodiment of the invention, the non-display area NDA may surround the display area DA in the top plan view and not display an image. The display area DA and the non-display area NDA may define an entirety of the display panel 110. The display region DP and the non-display region NDP of the display unit 100 may be defined by the display area DA and the non-display area NDA of the display panel 110, respectively. In more detail, the display region DP and the non-display region NDP of the display unit 100 may be defined in regions corresponding to the display area DA and the non-display area NDA of the display panel 110, respectively.

The display panel 110 includes a lower display substrate (not shown), an upper display substrate (not shown) facing the lower display substrate, and an optical medium layer such as a liquid crystal layer (not shown) disposed between the two display substrates.

The lower display substrate may have a gate line, a data line, a thin film transistor and a pixel electrode. Each of these elements may be provided in plurality on a base substrate of the lower display substrate. The gate lines and the data lines may be insulated from each other and also may cross each other in the top plan view. The thin film transistor may be a three-terminal element, and thus be connected to one gate line, one data line and one pixel electrode. A data voltage applied to the data line may be applied to the pixel electrode according to a signal applied to the gate line. Each of the gate line, the data line, the thin film transistor and the pixel electrode are disposed in the display area DA of the display panel 110.

The upper display substrate may be disposed to face the lower display substrate with the liquid crystal layer therebetween. The upper display substrate may include a color filter and a common electrode on a base substrate of the upper display substrate. However, the embodiment of the invention is not limited thereto. In another embodiment, at least one of the color filter and the common electrode may be disposed in the lower display substrate. In further embodiment, the upper display substrate and elements thereof may be omitted, and thus the color filter, the common electrode and the liquid crystal layer sealed by an insulation layer may be disposed within the lower display substrate having only one base substrate.

The upper display substrate may have a planar size less than that of the lower display substrate. A portion of the lower display substrate may be exposed by the upper display substrate.

The liquid crystal layer may include a plurality of liquid crystal molecules. The plurality of liquid crystal molecules may have an arrangement state that changes according to an electric field formed between the upper and lower display substrates or between the pixel and common electrodes.

In FIG. 1, the display panel 110 may have an overall rectangular shape in the top plan view. In an exemplary embodiment, for example, the display panel 110 may define a first pair of parallel sides which are relatively longer than a second pair or parallel sides. The display panel 110 may have a relatively long side defining a length thereof extending in a first direction DR1 and a relatively short side defining a length thereof extending in a second direction DR2 crossing the first direction DR1. The display panel 110 may be disposed in a plane defined by the first and second directions DR1 and DR2. A thickness direction of the display panel 110 may be defined in a third direction DR3. The first to third directions DR1, DR2 and DR3 may be orthogonal to each other, but the invention is not limited thereto.

The display apparatus 1000 may further include a flexible printed circuit board (not shown) and a printed circuit board (not shown). The printed circuit board may generate and output a signal to the display panel 110 or receive a signal from the display panel 110 through the flexible printed circuit board.

According to an embodiment of the invention, an integrated circuit chip (not shown) may be mounted on the flexible printed circuit board. A data driving circuit (not shown) may be provided in the integrated circuit chip. The flexible printed circuit board may be a tape carrier package ("TCP") or a chip on film ("COF"). However, the embodiment of the invention is not limited thereto. In an exemplary embodiment, for example, the integrated circuit chip may be directly mounted on one surface of the lower display substrate.

The optical sheet 120 may include plural individual sheets such as a diffusion sheet, a light collection sheet and a protection sheet. The diffusion sheet may diffuse light incident thereto. The light collection sheet may increase luminance of the diffused light from the diffusion sheet. The protection sheet may protect the light collection sheet and secure a relatively viewing angle. Although the optical sheet 120 is constituted by three individual sheets in an embodiment of the invention, the invention is not limited thereto. For example, the optical sheet 120 may be constituted by four sheets or more. Also, the optical sheet 120 may be constituted by the light collection sheet and the protection sheet in the state in which the diffusion sheet is omitted.

The backlight unit BLU may be disposed under the display panel 110 to generate and provide light to the display panel 110.

In an embodiment of the invention, the backlight unit BLU includes an intermediate mold (frame) 200, a transparent mold (frame) 300, a diffusion plate 500, a light source 600, a bottom cover 700 and a reflective sheet 750. The intermediate mold 200 and the transparent mold 300 may collectively define a supporting member of the display apparatus 1000.

The bottom cover 700 may include or define a bottom portion 710 and a sidewall portion 720.

In an exemplary embodiment, for example, the bottom portion 710 may be flat. The bottom portion 710 may have an overall rectangular shape in the top plan view.

The sidewall portion 720 may extend upward from an edge of the bottom portion 710. The sidewall portion 720 may include first to fourth sidewalls 721 to 724. The first to fourth sidewalls 721 to 724 may be connected to four sides of the bottom portion 710, respectively. The first to fourth sidewalls 721 to 724 may extend from the bottom portion 710 in the third direction DR3. One of the bottom portion 710 and the first to fourth sidewalls 721 to 724 may extend to define the other ones of the bottom portion 710 and the first to fourth sidewalls 721 to 724.

The reflective sheet 750 is disposed on the bottom portion 710 and under the light source 600. The reflective sheet 750 may include a light reflective material. The reflective sheet 750 reflects most of the light incident to the reflective sheet 750.

The backlight unit BLU may further include a driving board (not shown). The driving board may be disposed between the bottom portion 710 and the reflective sheet 750. The driving board is electrically connected to the light source 600 to supply a driving signal to the light source 600. The driving board may be provided in plurality.

The light source 600 may be accommodated in the bottom cover 700. The light source 600 generates and emits light. The light source 600 may be provided in plurality and disposed on the reflective sheet 750. The light source 600 may be provided in a direct-type structure, that is, under and overlapping the display unit 100. The light generated and emitted from the light source 600 may be directly incident to the diffusion plate 500 and the display panel 110, but the invention is not limited thereto.

Each of the light sources 600 may be at least one of a cold cathode fluorescent lamp ("CCFL"), a flat fluorescent lamp ("FFL") and a light emitting diode ("LED"). Hereinafter, a structure in which each of the light sources 600 is the light emitting diode will be described as an example.

The light source 600 may be constituted by white light sources emitting white light. However, the embodiment of the invention is not limited thereto. In an exemplary embodiment, for example, the light source 600 may include a red light source emitting red light, a green light source emitting green light and a blue light source emitting blue light.

In an embodiment of the invention a top cover 800 may be further provided. The top cover 800 covers an edge of the display panel 110 and is coupled to the display panel 110 and the backlight unit BLU. The top cover 800 includes or defines an opening which exposes the display area DA of the display panel 110 to outside the display apparatus 1000.

The top cover 800 may include or define a horizontal cover portion 810 and a vertical cover portion 820. The horizontal cover portion 810 may be disposed on the non-display area NDA of the display panel 110 and not overlapping the display area DA of the display panel 110 when viewed in the third direction DR3, that is, in the top plan view. In an embodiment of the invention, the horizontal cover portion 810 may be spaced a distance of about 0.1 millimeter (mm) from the display area DA in a direction parallel to the second direction DR2.

The vertical cover portion 820 may extend downward from the horizontal cover portion 810 and surround outer surfaces of the intermediate mold 200 and the bottom cover 700.

Figure 3:
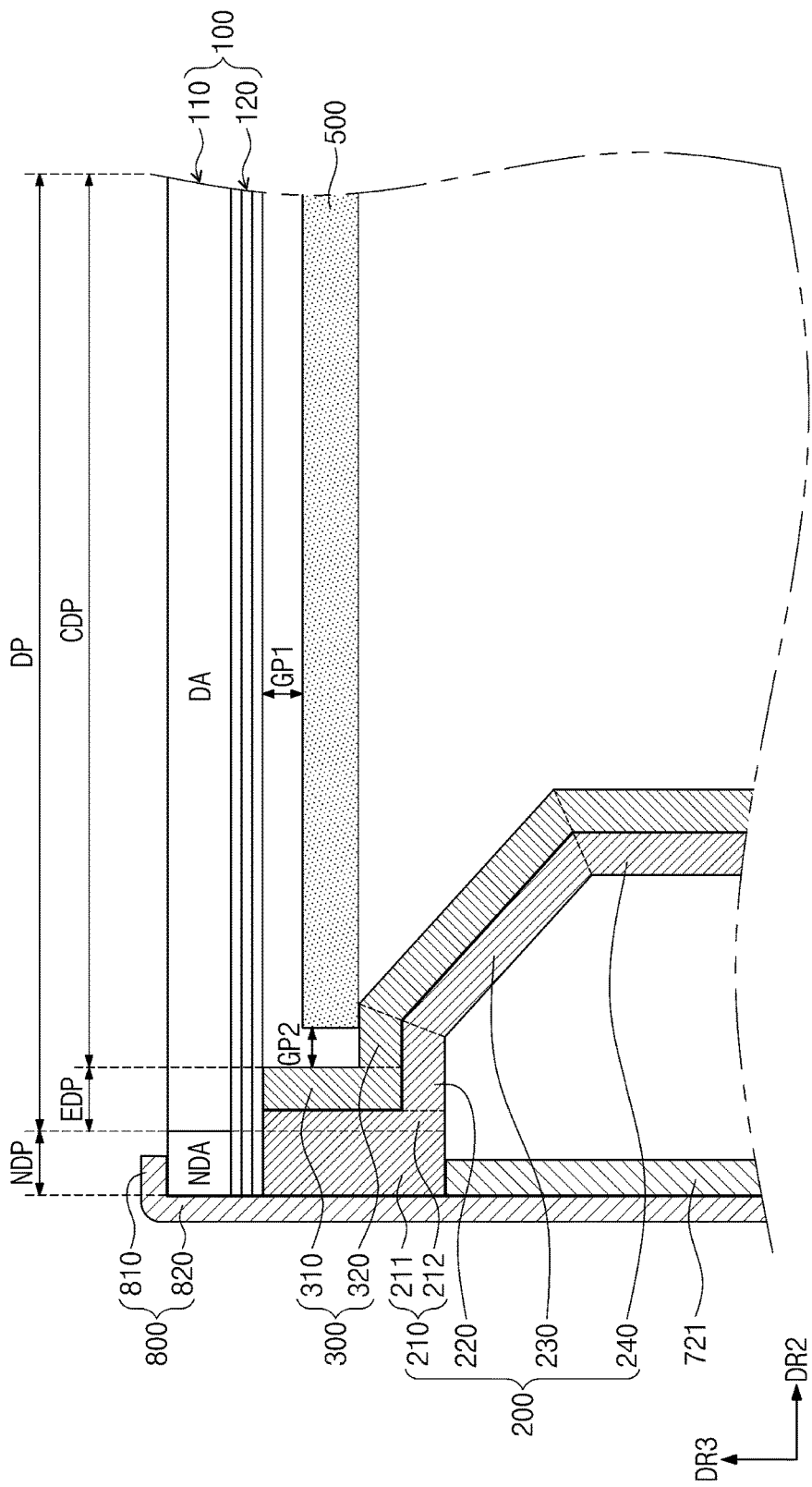
FIG. 3 is an enlarged cross-sectional view of a portion of an area of FIG. 2.

FIG. 3 is an enlarged cross-sectional view of a portion of an area illustrated in FIG. 2. While the structure in FIG. 3 is illustrated in the second direction DR2 from an outer edge of a long side of the display apparatus 1000 (line I-I'), in one or more exemplary embodiments, the structure in FIG. 3 may be similarly applied in the first direction DR1 from an outer edge of a short side of the display apparatus 1000. That is, the extension direction of the display region DP may be in the first or second directions DR1 and DR2.

Referring to FIG. 3, the display region DP of the display unit 100 may include an edge display region EDP and a central display region CDP. In an embodiment of the invention, the edge display region EDP may extend from an edge of the central display region CDP. The edge display region EDP may be defined between the central display region CDP and the non-display region NDP.

In an embodiment of the invention, the intermediate mold 200 may include a support 210, an intermediate seat portion 220, an inclined portion 230 and a vertical support 240.

The support 210 includes first and second intermediate supports 211 and 212. The support 210 may be provided in one body, that is, the first and second intermediate supports 211 and 212 may form a single, unitary member and define an entirety of the support 210. The support 210 may support the display unit 100 thereon and space the diffusion plate 500 apart from the display unit 100 in the third direction DR3. The support 210 and constituent portions thereof may define a length thereof extended in the first direction DR1, a width thereof extended in the second direction DR2 and a thickness thereof extended in the third direction DR3. Referring to FIGS. 1-3, the length of the support 210 may be larger than both the width and thickness of thereof.

The support 210 may reflect most of the light without changing a color coordinate thereof. For this, the support 210 may have a white color and/or include a reflective surface having a white color. Thus, when the support 210 reflects white light, the incident white light and the reflected white light may have substantially the same white color coordinate as each other.

The first intermediate support 211 may be disposed under and overlapping the non-display region NDP to support the non-display region NDP of the display unit 100. In an embodiment of the invention, the first intermediate support 211 may contact a portion of the optical sheet 120 which is defined in the non-display region NDP of the display unit 100, and support the portion of the optical sheet 120.

A thickness of the first intermediate support 211 may be substantially parallel to the third direction DR3. The first intermediate support 211 may be disposed on the first sidewall 721. The first sidewall 721 may contact the first intermediate support 211 to support the first intermediate support 211.

The second intermediate support 212 may be disposed adjacent to the first intermediate support 211 in the second direction DR2 and under the edge display region EDP to support a portion of the edge display region EDP of the display unit 100. In an embodiment of the invention, the second intermediate support 212 may contact a portion of the optical sheet 120, which is defined at the edge display region EDP of the display unit, and support the portion of the optical sheet 120.

A thickness of the second intermediate support 212 may be substantially parallel to the third direction DR3. The second intermediate support 212 may be integrated with the first intermediate support 211. That is, the first and second intermediate supports 211 and 212 may form a single, unitary member and define an entirety of the support 210. One of the first and second intermediate supports 211 and 212 may extend to define the other one of first and second intermediate supports 211 and 212.

The intermediate seat portion 220 extends from a lower end of the support 210 in the second direction DR2. The intermediate seat portion 220 may be disposed under the display region DP of the display unit 100. In an exemplary embodiment, for example, the intermediate seat portion 220 may be extended parallel to the first direction DR1. The intermediate seat portion 220 may be disposed in a plane parallel to a plane defined in the first and second directions DR1 and DR2. That is, the intermediate seat portion 220 may extend in a direction substantially parallel to the display unit 100.

The inclined portion 230 may extend from a distal end of the intermediate seat portion 220. In an exemplary embodiment, for example, the inclined portion 230 may extend away from the distal end of the intermediate seat portion 220 in the second direction DR2 and inclinedly downward.

The vertical support 240 may extend downward from a distal end of the inclined portion 230. The vertical support 240 may have a distal end contacting the reflective sheet 750. As a result, the reflective sheet 750 may support the vertical support 240, and thus the support 210 of the intermediate mold 200 may be stably fixed through the vertical support 240 in contact with the reflective sheet 750.

The transparent mold 300 may be disposed on the intermediate mold 200. The transparent mold 300 includes a transparent support 310 and a transparent seat portion 320. The transparent support 300 may be provided in one body. That is, the transparent support 310 and the transparent seat portion 320 may form a single, unitary member and define an entirety of the transparent mold 300. The transparent mold 300 and constituent portions thereof may define a length thereof extended in the first direction DR1, a width thereof extended in the second direction DR2 and a thickness thereof extended in the third direction DR3. Referring to FIGS. 1-3, the length of transparent mold 300 may be larger than both the width and thickness of thereof.

The transparent mold 300 may be transparent. In an exemplary embodiment, for example, the transparent mold 300 may have a light transmittance of about 50% to about 99%. In an embodiment of the invention, the transparent mold 300 may have a light transmittance greater than that of the intermediate mold 200, and the transparent mold 300 may have a reflective index less than that of the intermediate mold 200.

The transparent support 310 may be disposed between the edge display region EDP of the display unit 100 and the intermediate seat portion 220 of the intermediate mold 200 to support the edge display region EDP. In an embodiment of the invention, the transparent support 310 may contact a portion of the optical sheet 120, which is defined on the edge display region EDP of the display unit 100, and support the portion of the optical sheet 120.

A thickness of the transparent support 310 may be substantially parallel to the third direction DR3. The transparent support 310 may have a surface contacting a facing surface of the second intermediate support 212.

The transparent seat portion 320 extends from a lower end of the transparent support 310 in the second direction DR2. The transparent seat portion 320 may be disposed between the central display region CDP of the display unit and the intermediate seat portion 220 of the intermediate mold 200. In an exemplary embodiment, for example, the transparent seat portion 320 may be parallel to the first direction DR1. The transparent seat portion 320 may be disposed in a plane parallel to the plane defined in the first and second directions DR1 and DR2.

The transparent seat portion 320 may have or define portions thereof extending parallel to the inclined portion 230 and to the vertical support 240 of the intermediate mold 200. The transparent seat portion 320 may have a surface contacting a facing surface of the inclined portion 230 and the vertical support 240.

The diffusion plate 500 may be disposed on the transparent seat portion 320. In an embodiment of the invention, the diffusion plate 500 may have an edge or end disposed between the transparent seat portion 320 of the transparent mold 300 and the display area DA of the display panel 110. The diffusion plate 500 may contact a top surface of the transparent seat portion 320, and the transparent seat portion 320 may support the edge or end of the diffusion plate 500 thereon.

The diffusion plate 500 may be spaced apart from the transparent support 310 in the second direction DR2. A second gap GP2 may be defined between the diffusion plate 500 and the transparent support 310 in the second direction DR2. Thus, damage to the diffusion plate 500 and the transparent support 310 due to an abrasion between the diffusion plate 500 and the transparent support 310 may be reduced or effectively prevented.

The diffusion plate 500 may overlap at least a portion of the transparent support 310 and at least a portion of the support 210 in the second direction DR2. That is, the diffusion plate 500 is disposed in a plane which is within the overall thickness of the transparent support 310 and the support 210.

Each of the support 210 and the transparent support 310 may have a thickness greater than that of the diffusion plate 500. Thus, the support 210 and the transparent support 310 are capable of spacing the optical sheet 120 apart from the diffusion plate 500 in the third direction DR3. A first gap GP1 may be defined between the diffusion plate 500 and the optical sheet 120 in the third direction DR3. The support 210 and the transparent support 310 may have thicknesses defined as dimensions of the support 210 and the transparent support 310 in the third direction DR3, respectively. The thicknesses may be defined by maximum dimensions of the support 210 and the transparent support 310 in the third direction DR3, respectively.

In an embodiment of a method of manufacturing a display apparatus 1000 according to the invention, the intermediate mold 200 and the transparent mold 300 may be formed by injection molding, such as double injection molding. The intermediate mold 200 may be coupled to the transparent mold 300 at an interface formed by the double injection molding. Thus, the intermediate mold 200 facing the transparent mold 300 may have a side surface thereof for which entire area of the side surface contacts that of the transparent mold 300. Similarly, an entirety of a bottom surface of the transparent mold 300 may contact the intermediate mold 200. Since by the injection molding described above entire areas of the intermediate mold 200 which faces the transparent mold 300 contacts the facing surfaces of the transparent mold 300, a member such as an adhesive, which attaches the transparent mold 300 to the intermediate mold 200 in a conventional display apparatus, may not be provided between the transparent mold 300 and the intermediate mold 200. In one or more exemplary embodiment according to the invention, the intermediate mold 200 and the transparent mold 300 may be double injection-molded to reduce manufacturing process costs and time and firmly couple the transparent mold 300 to the intermediate mold 200.

The embodiment of the invention is not limited thereto. In an exemplary embodiment, for example, the transparent mold 300 may be attached to the intermediate mold 200 by a fixing member such an adhesive (not shown) provided between the transparent mold 300 and the intermediate mold 200. In summarizing the above-described descriptions, since the transparent mold 300 is transparent, the transparent mold 300 may be also disposed on an area corresponding to the display region DP of the display unit 100 to support the optical sheet 120 thereof. Since the light incident to the transparent mold 300 may pass through the transparent mold 300 and be supplied to the optical sheet 120 and to the edge display region EDP of the display unit 100, an edge dark area may be reduced or effectively prevented in the edge display region EDP.

Also, since the optical sheet 120 is also supported by the transparent mold 300, the intermediate mold 200 may decrease in width in the second direction DR2. As a result, since the display region DP of the display unit 100 and the intermediate mold 200 (having the higher reflective index) may decrease in overlapping area, a width of the bezel (as a non-display area) of the display apparatus 1000 in the second direction DR2 may decrease.

Also, since the transparent mold 300 is transparent, the transparent mold 300 may have a width that is not limited in the second direction DR2 and thus have a sufficient thickness in the third direction DR3. As a result, the optical sheet 120 may be stably supported by increasing an area of the transparent mold 300 in the top plan view, which overlaps and supports the optical sheet 120 thereon.

Furthermore, since the intermediate mold 200 has a white color, the intermediate mold 200 may reflect the white light incident to the intermediate mold 200 to allow the reflected light to proceed along an optical path in a direction from the transparent mold 300 to the edge display region EDP. Therefore, luminance uniformity may be improved.

In contrast to one or more exemplary embodiment according to the invention, in a conventional display apparatus, if the transparent mold 300 is not provided as a portion of an overall supporting member, when the intermediate mold 200 does not have a predetermined width in a direction away from an outer edge of the display apparatus, the optical sheet 120 may not be stably supported, and thus the optical sheet 120 and the display unit 110 may be deflected downward and separated from initial positions thereof. However, when the conventional intermediate mold 200 increases in width by a predetermined thickness or more in the direction away from the outer edge of the display apparatus to stably support the optical sheet 120, the bezel may undesirably increase in size. Particularly, a bezel area at which the intermediate mold 200 is adjacent to or overlaps the display region DP in the third direction DR3 may increase to generate the edge dark area.

Figure 4:
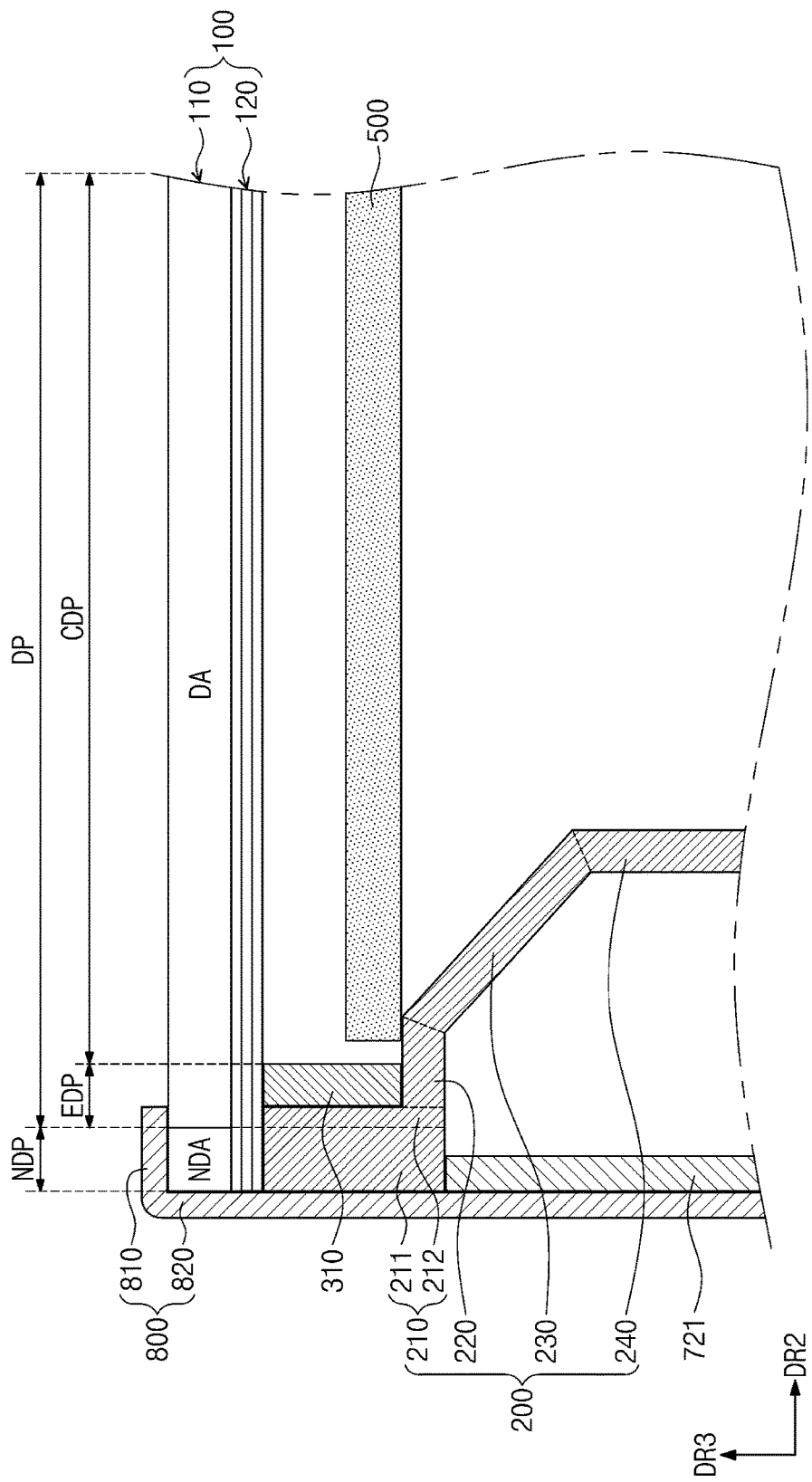
FIG. 4 is an enlarged cross-sectional view of another exemplary embodiment of a portion of an area of FIG. 2 according to the invention.

FIG. 4 is an enlarged cross-sectional view of another exemplary embodiment of a portion of an area of FIG. 2 according to the invention. The structure disclosed in FIG. 4 is substantially the same as that disclosed in FIG. 3, except for a transparent mold, and repeated description of same elements will be omitted for convenience. While the structure in FIG. 4 is illustrated in the second direction DR2 from an outer edge of a long side of the display apparatus 1000 (line I-I'), in one or more exemplary embodiment, the structure in FIG. 4 may be similarly applied in the first direction DR1 from an outer edge of a short side of the display apparatus 1000.

A transparent mold 310 of FIG. 4 is the same as the transparent mold 300 of FIG. 3 except that the transparent seat portion 320 of FIG. 3 is omitted.

Referring to FIG. 4, the transparent mold 300 may include only the transparent support 310. In an embodiment of the invention, the transparent mold 300 may be attached to the second intermediate support 212 of the intermediate mold 200 by an adhesion member (not shown) disposed between the transparent mold 300 and the second intermediate support 212, but the invention is not limited thereto.

The diffusion plate 500 may have an edge or end disposed between the intermediate seat portion 220 of the intermediate mold 200 and the display region DP of the display unit 100, and the intermediate seat portion 220 may support the edge or end of the diffusion plate 500. The supported edge or end of the diffusion plate 500 may be spaced apart from the transparent support 310 in the second direction DR2.

Figure 5:
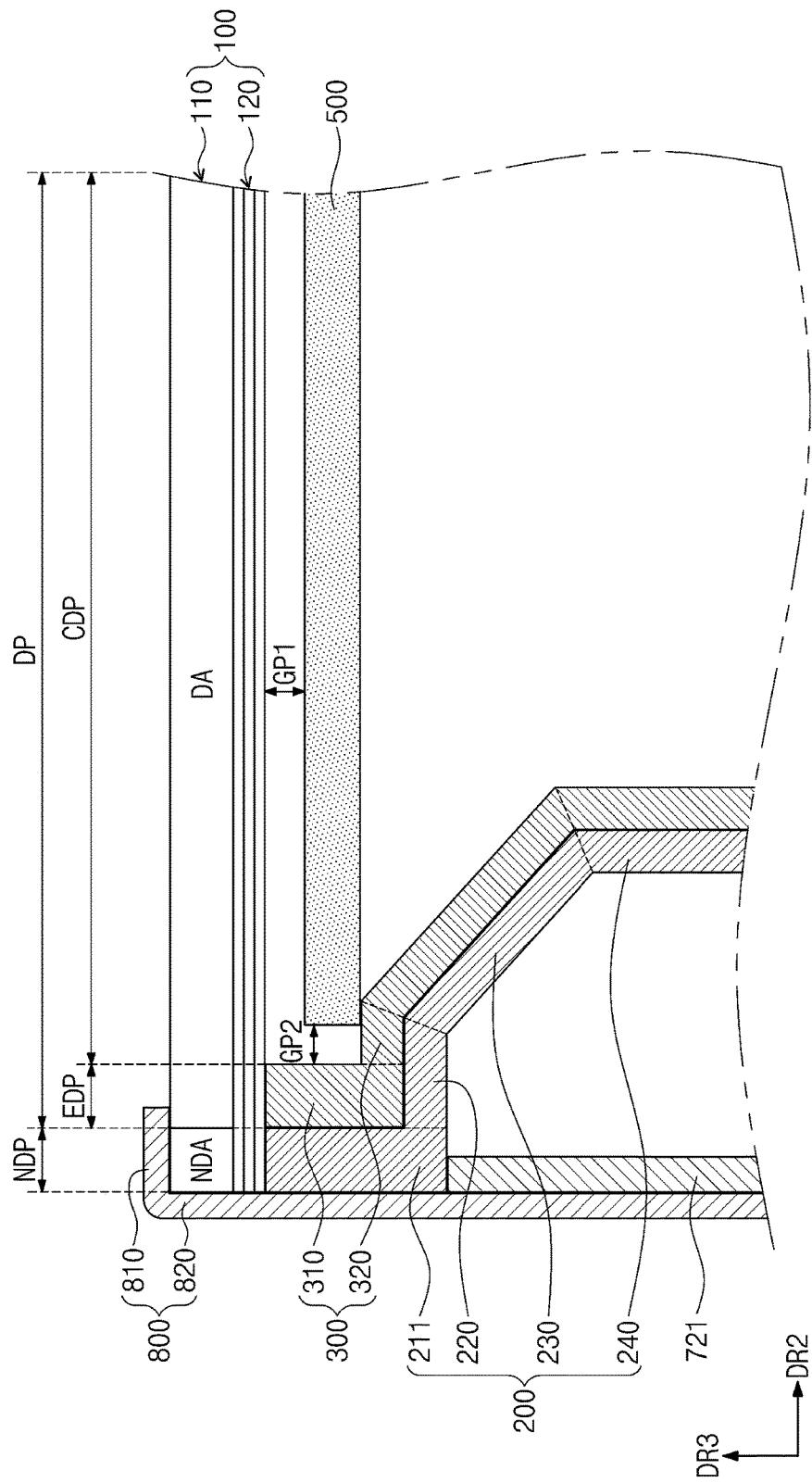
FIG. 5 is an enlarged cross-sectional view of still another exemplary embodiment of a portion of an area of FIG. 2 according to the invention.

FIG. 5 is an enlarged cross-sectional view of still another exemplary embodiment of a portion of an area of FIG. 2 according to the invention. The structure disclosed in FIG. 5 is substantially the same as that disclosed in FIG. 3, except for an intermediate mold and a transparent mold, and repeated description of same elements will be omitted for convenience. While the structure in FIG. 5 is illustrated in the second direction DR2 from an outer edge of a long side of the display apparatus 1000 (line I-I'), in one or more exemplary embodiment, the structure in FIG. 5 may be similarly applied in the first direction DR1 from an outer edge of a short side of the display apparatus 1000.

A support 210 of the intermediate mold 200 of FIG. 5 is the same as the support 210 of FIG. 3 except that the second intermediate support 212 of FIG. 3 is omitted.

Referring to FIG. 5, the support (210 in FIG. 3) includes only the first intermediate support 211. A side surface of the transparent support 310 of the transparent mold 300 may contact a side surface of the first intermediate support 211. Thus, the support (210 in FIG. 3) may not overlap the display region DP of the display unit 100 in the third direction DR3, different from the support 210 in FIG. 3. Therefore, since reflective support 210 excludes the second intermediate support 212 in the display region DP, the bezel at which an image is not visible may decrease in width to reduce or effectively prevent the edge dark region area.

Figure 6:
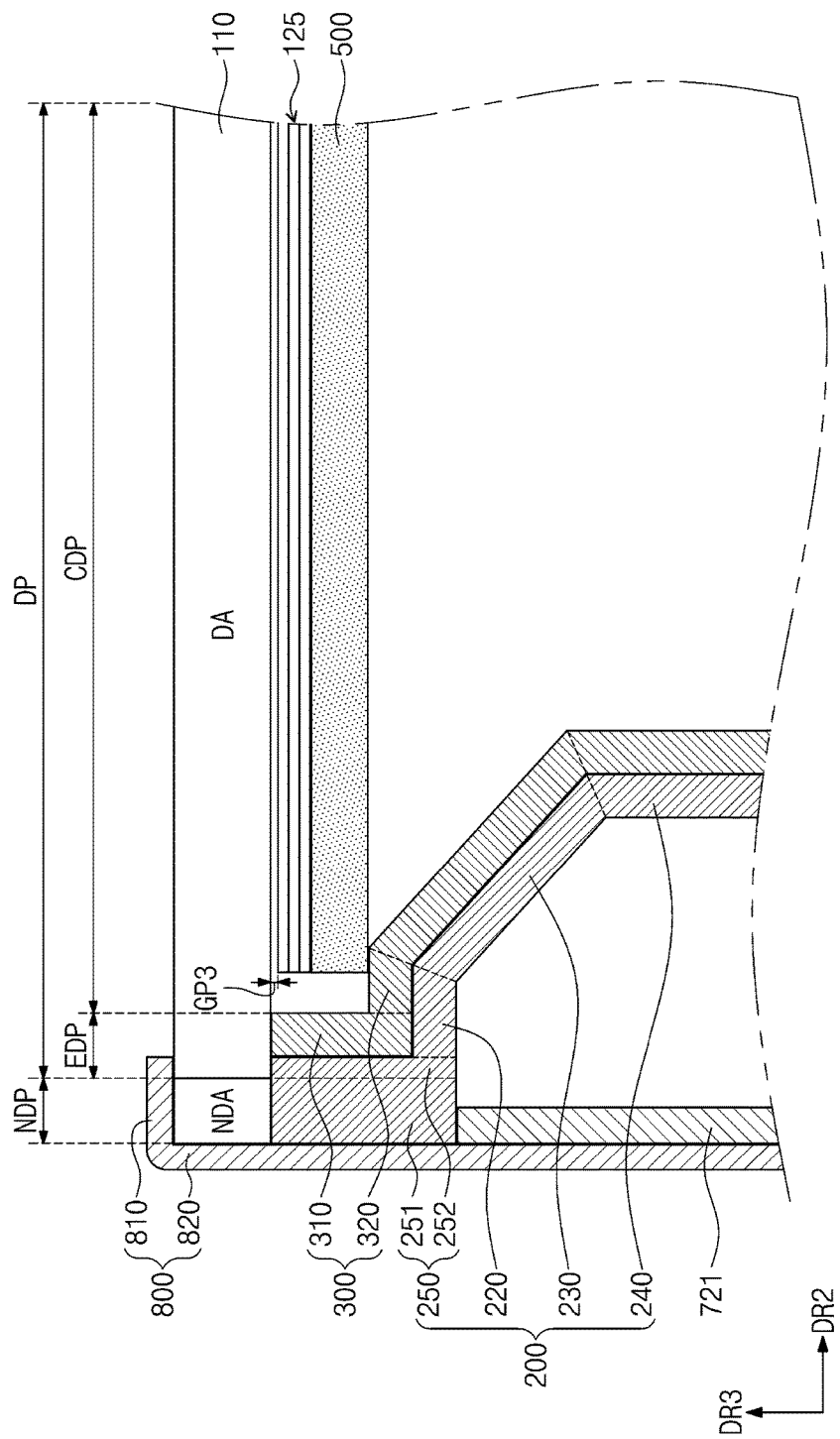
FIG. 6 is an enlarged cross-sectional view of yet another exemplary embodiment of a portion of an area of FIG. 2 according to the invention.

FIG. 6 is an enlarged cross-sectional view of yet another exemplary embodiment of a portion of an area of FIG. 2 according to the invention. The structure disclosed in FIG. 6 is substantially the same as that disclosed in FIG. 3, except for a display unit and a transparent mold, and repeated description of same elements will be omitted for convenience. While the structure in FIG. 6 is illustrated in the second direction DR2 from an outer edge of a long side of the display apparatus 1000 (line I-I'), in one or more exemplary embodiment, the structure in FIG. 6 may be similarly applied in the first direction DR1 from an outer edge of a short side of the display apparatus 1000.

Referring to FIG. 6, a display unit may include only the display panel 110 and not include an optical sheet 125, different from the display unit 100 including the optical sheet 120 in FIG. 3.

In an embodiment of the invention, the optical sheet 125 may be disposed on the diffusion plate 500 and outside the display unit.

In an embodiment of the invention, a support 250 of an intermediate mold 200 may include first and second intermediate supports 251 and 252. The first intermediate support 251 may be disposed under the non-display area NDA of the display panel 110 to support the non-display area NDA. In an embodiment of the invention, the first intermediate support 251 may contact a portion of the non-display area NDA of the display panel 110.

The second intermediate support 252 may be disposed under the display area DA of the display panel 110 defined in the edge display region EDP of the display unit to support a portion of the display area DA. In an embodiment of the invention, the second intermediate support 252 may contact a portion of the display area DA of the display panel 110 defined in the edge display region EDP of the display unit.

The display panel 110 may be spaced apart from the optical sheet 125 in the third direction DR3 to define a third gap GP3 between the display panel 110 and the optical sheet 125.

Figure 7:
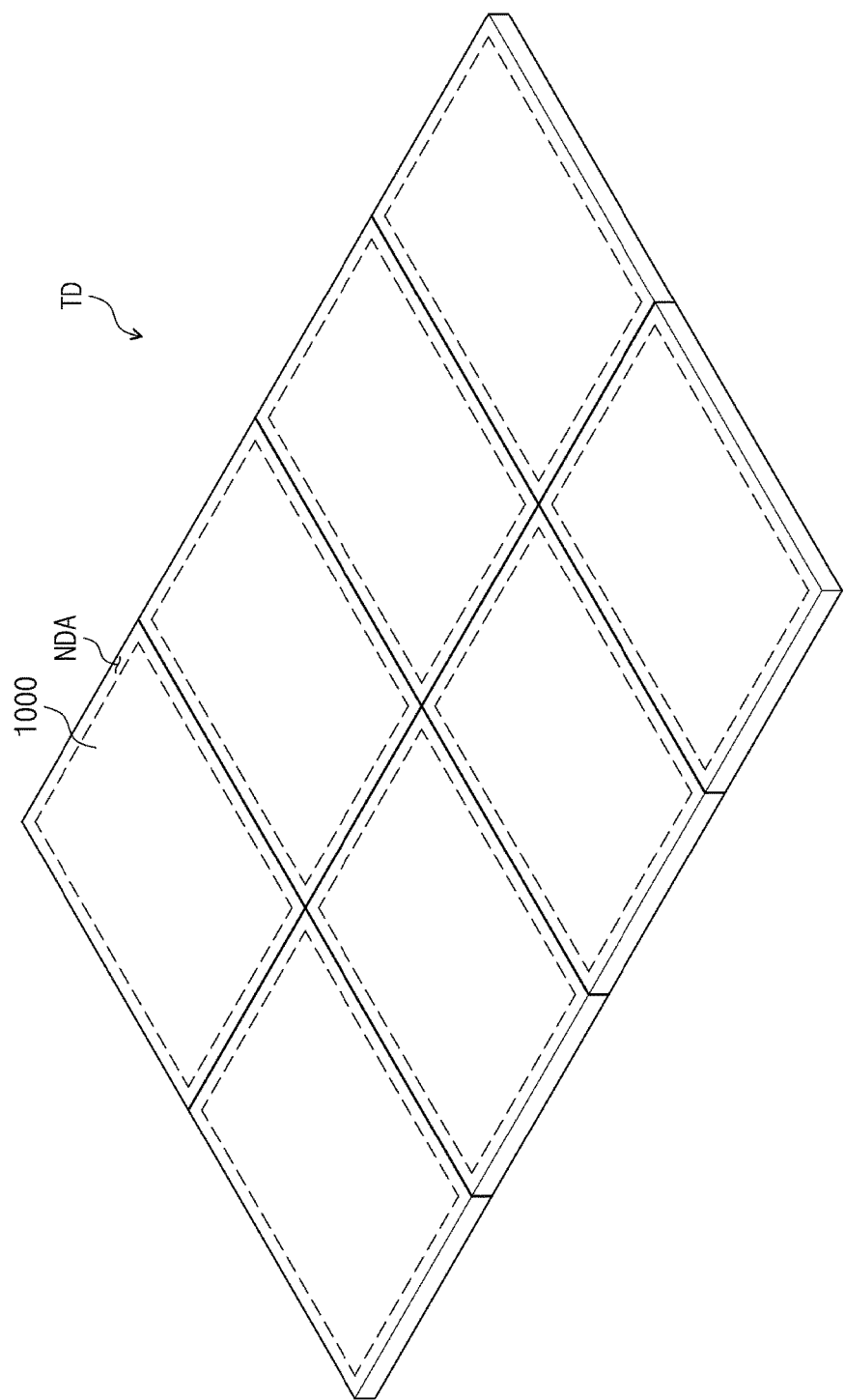
FIG. 7 is a view of an exemplary embodiment of a tiled display device including the display apparatus provided in plurality according to the invention.

FIG. 7 is a view of an exemplary embodiment a tiled display device in which a display apparatus is provided in plurality according to the invention.

As illustrated in FIG. 7, a display apparatus 1000 according to one or more exemplary embodiment disclosed in FIGS. 2-6 may be provided in plurality and coupled to each other to constitute a tiled display device TD for forming a relatively large display screen. In an exemplary embodiment, for example, the plurality of display apparatuses 1000 may be coupled to each other in a matrix form having M rows and N columns (where M and N are natural numbers). In an embodiment of the invention, M may be 2, and N may be 4 as illustrated in FIG. 7, but the invention is not limited thereto.

As described above, since a width of the bezel (or the non-display area NDA) of the display apparatus 1000 may be smaller to reduce or effectively prevent the edge dark area from occurring, a user may not distinguish boundaries between adjacent display apparatuses 1000 within the tiled display device TD. Thus, the tiled display device TD may smoothly and continuously display a relatively large image to improve image quality of the tiled display device TD.

The display apparatus according to one or more exemplary embodiment of the invention includes the transparent mold. Since the display region of the display unit is supported by the transparent mold, the display unit may be stably supported. Also, since the transparent mold is transparent in the display region of the display unit, the light provided from the backlight unit may not be blocked from being incident to the display unit. Thus, the edge dark area may be reduced or effectively prevented from occurring at an edge area of the display unit. Furthermore, since the area at which the intermediate mold overlaps the display region of the display unit decreases, an overall size of the bezel of the display apparatus may decrease in width.

The invention should not be limited to these exemplary embodiments. Also, it is obvious to a person ordinarily skilled in the art that various changes and modifications can be made within the spirit and scope of the invention. Hence, these changed examples and modified examples should be seen as within the scope of the appended claims of the invention.

What is claimed is:

1. A display apparatus comprising:
   a display unit comprising:
      a non-display region, and
      a display region extending from the non-display region in an extension direction, an edge display region of the display region being closest the non-display region;
   an intermediate mold comprising:
      a first intermediate support disposed under the non-display region to support the non-display region, and
      an intermediate seat portion extending from the first intermediate support and disposed under the display region; and
   a transparent mold disposed between the intermediate seat portion and the display region and comprising a transparent support in contact with the edge display region of the display region to support the edge display region.

2. The display apparatus of claim 1, further comprising a diffusion plate,
   wherein
   the transparent mold further comprises a transparent seat portion which extends in the extension direction of the display region from an end of the transparent support, and
   an end of the diffusion plate is disposed overlapping the transparent seat portion of the transparent mold.

3. The display apparatus of claim 2, wherein
the display region of the display unit further comprises a central display region adjacent in the extension direction of the display region to the edge display region,
the transparent seat portion of the transparent mold is in the central display region, and
the end of the diffusion plate is disposed between the transparent seat portion and the display unit at the central display region thereof.

4. The display apparatus of claim 2, wherein the transparent seat portion supports the diffusion plate.

5. The display apparatus of claim 2, wherein the transparent seat portion of the transparent mold is disposed between the intermediate seat portion of the intermediate mold and the display unit.

6. The display apparatus of claim 2, wherein the transparent support of the transparent mold is disposed between the diffusion plate and the first intermediate support of the intermediate mold in the extension direction of the display region.

7. The display unit of claim 2, wherein
the display unit further comprises:
 a display panel which generates an image and displays the image, and
 an optical sheet which is disposed under the display panel, and
the first intermediate support of the intermediate mold and the transparent support of the transparent mold each contact a bottom surface of the optical sheet to support the bottom surface of the optical sheet.

8. The display apparatus of claim 7, wherein a thickness of the transparent support of the transparent mold is greater than that of the diffusion plate, and a gap is defined between the bottom surface of the optical sheet and a top surface of the diffusion plate.

9. The display apparatus of claim 2, wherein
the display unit further comprises a display panel which generates an image and displays the image, and
the first intermediate support of the intermediate mold and the transparent support of the transparent mold each contact a bottom surface of the display panel to support the bottom surface of the display panel.

10. The display apparatus of claim 9, further comprising an optical sheet,
wherein the optical sheet is disposed on the diffusion plate, and a gap is defined between a top surface of the optical sheet and the bottom surface of the display panel.

11. The display apparatus of claim 1, wherein
the first intermediate support of the intermediate mold and the transparent support of the transparent mold extend in a thickness direction of the display unit, and
the intermediate seat portion of the intermediate mold extends in the extension direction of the display region from a lower end of the first intermediate support and is parallel to the display unit.

12. The display apparatus of claim 11, wherein the intermediate mold further comprises an inclined portion extending in the extension direction of the display region and inclinedly downward from a distal end of the intermediate seat portion.

13. The display apparatus of claim 1, further comprising a diffusion plate,
wherein
an end of the diffusion plate is disposed between the intermediate seat portion of the intermediate mold and the display unit at the display region thereof, and
the end of the diffusion plate is spaced apart from the transparent support of the transparent mold in the extension direction of the display region.

14. The display apparatus of claim 13, wherein the transparent support of the transparent mold is attached to a side surface of the first intermediate support of the intermediate mold.

15. The display apparatus of claim 1, further comprising a light source which generates a light and provides the light to the display unit,
wherein the light source is disposed under the display region of the display unit and spaced apart from the intermediate mold in the extension direction of the display region to emit the light to a bottom surface of the display unit at the display region thereof.

16. The display apparatus of claim 15, further comprising a bottom cover in which the light source is received,
wherein
the bottom cover comprises a bottom portion on which the intermediate mold and the light source are disposed, and a sidewall which extends from the bottom portion, and
the sidewall of the bottom cover is disposed between the first intermediate support of the intermediate mold and the bottom portion of the bottom cover to support the first intermediate support thereon.

17. The display apparatus of claim 1, wherein
a side surface of the transparent mold is coupled to a facing side surface of the intermediate mold at a double injection-molded interface therebetween, and
an entirety of a bottom surface of the transparent mold contacts the intermediate mold.

18. A display apparatus comprising:
a display unit comprising a non-display region and a display region which extends from the non-display region in an extension direction;
an intermediate mold comprising:
 a first intermediate support disposed under the non-display region to support the non-display region,
 a second intermediate support adjacent in the extension direction of the display region to the first intermediate mold support in the non-display region of the display unit, and
 an intermediate seat portion extending from the first intermediate support and disposed under the display region; and
a transparent mold disposed between the intermediate seat portion and the display region and comprising a transparent support configured to support an edge display region of the display region, which is adjacent to the non-display region,
wherein the second intermediate support is disposed in the edge display region of the display unit to support the edge display region.

19. The display apparatus of claim 18, wherein a side surface of the second intermediate support of the intermediate mold contacts a side surface of the transparent support of the transparent mold.

20. A tiled display device comprising:
a display apparatus provided in plurality in a matrix form having M rows and N columns, wherein M and N are natural numbers,
each of the display apparatuses comprising:
 a display unit comprising a non-display region and a display region which extends from the non-display region in at least one direction, an edge display region of the display region being closest the non-display region;
an intermediate mold comprising:
   a first intermediate support disposed under the non-display region to support the non-display region, and
   an intermediate seat portion extending from the first intermediate support and disposed under the display region; and
a transparent mold disposed between the intermediate seat portion and the display region and comprising a transparent support in contact with the edge display region of the display region to support the edge display region.

* * * * *